April 8, 1924.
S. P. SHELL
1,490,035
BOLL WEEVIL EXTERMINATOR
Filed May 21, 1923     3 Sheets-Sheet 1
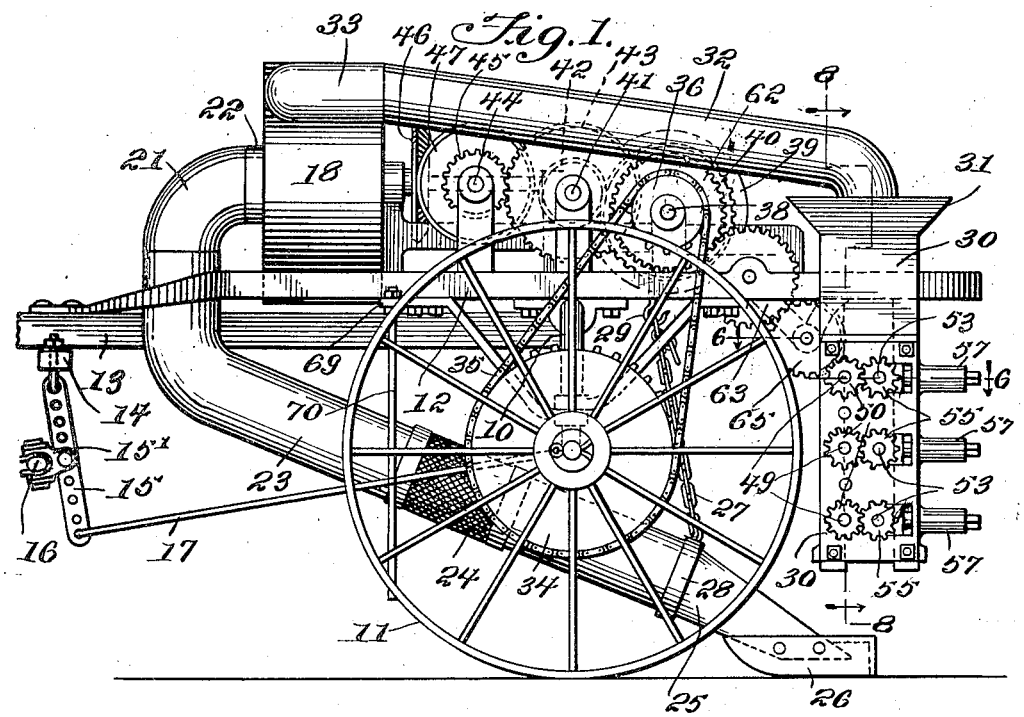
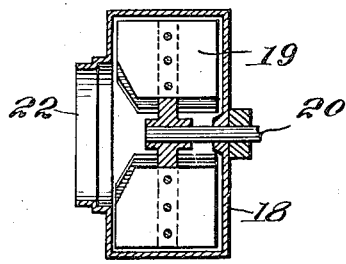
Sanders P. Shell
INVENTOR
BY Victor J. Evans
ATTORNEY
WITNESS: J. T. L. Wright April 8, 1924.
S. P. SHELL
1,490,035
BOLL WEEVIL EXTERMINATOR
Filed May 21, 1923   3 Sheets-Sheet 2
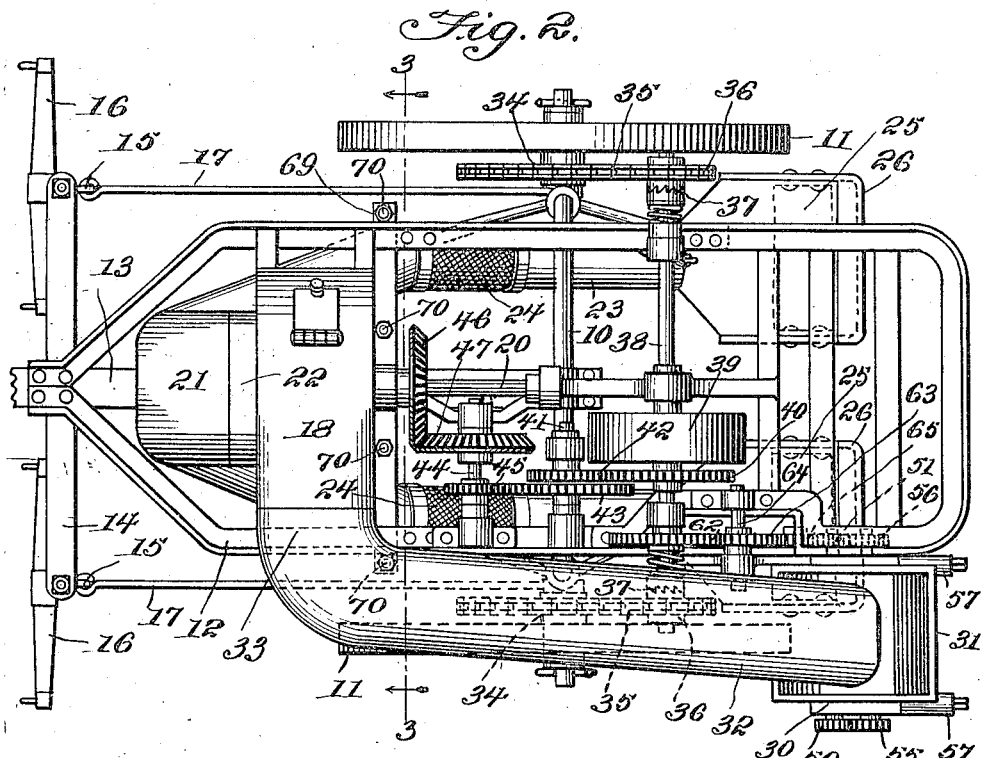
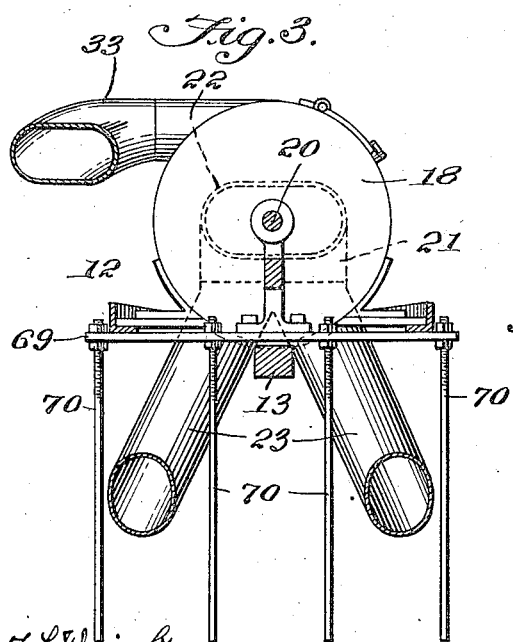
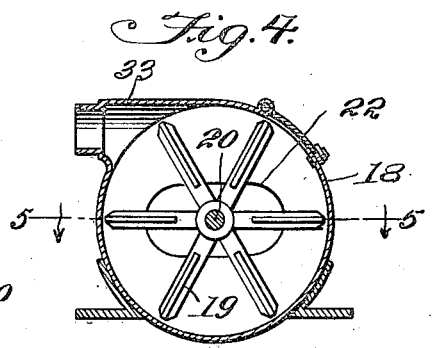
Sanders P. Shell
INVENTOR
BY Victor J. Evans
ATTORNEY
WITNESS:

April 8, 1924.
S. P. SHELL
1,490,035
BOLL WEEVIL EXTERMINATOR
Filed May 21, 1923   3 Sheets-Sheet 3
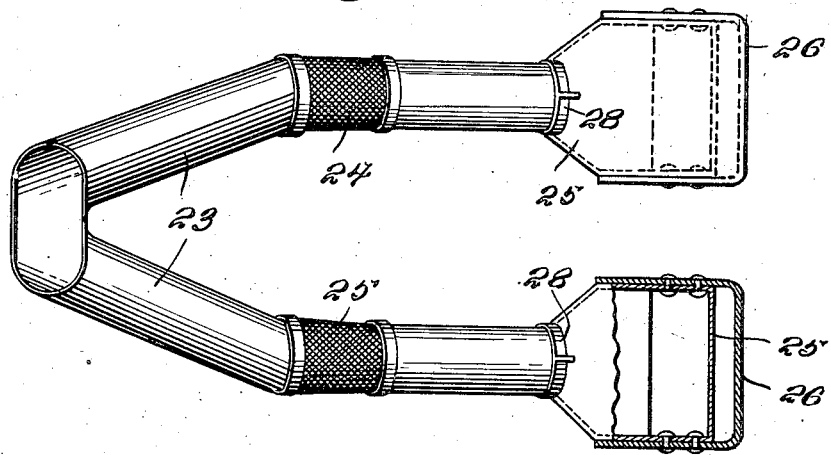
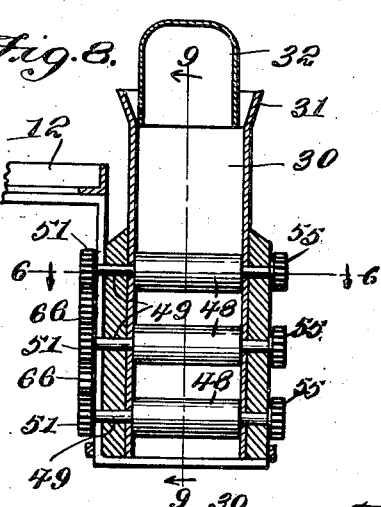
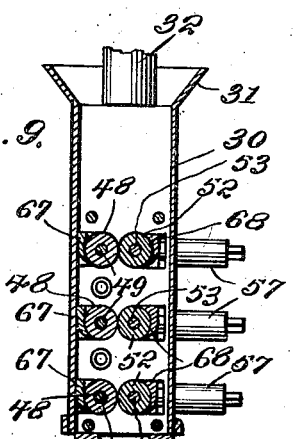
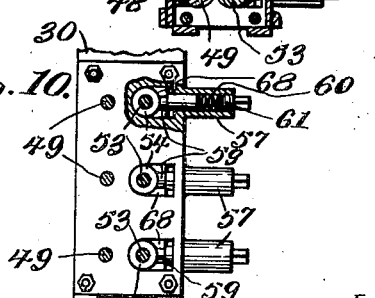
Inventor
Sanders P. Shell
BY Victor J. Evans
ATTORNEY Patented Apr. 8, 1924.

1,490,035

UNITED STATES PATENT OFFICE.

SANDERS P. SHELL, OF VAN ALSTYNE, TEXAS.

BOLL-WEEVIL EXTERMINATOR.

Application filed May 21, 1923. Serial No. 640,505.

*To all whom it may concern:*

Be it known that I, SANDERS P. SHELL, a citizen of the United States, residing at Van Alstyne, in the county of Grayson and State of Texas, have invented new and useful Improvements in Boll-Weevil Exterminators, of which the following is a specification.

This invention relates to insect destroying devices and has for its object the provision of a machine which may be built complete in itself or which may be constructed as an attachment to a cultivator or other wheeled implement and which includes power driven suction operated means for collecting from the ground and cotton plants all the weevils, punctured squares and other débris and gathering such matter into a suitable receptacle.

Another object is the provision of a machine of this character in which the collecting receptacle contains coacting rollers which are positively driven and between which the insects and other matter collected are crushed for the purpose of absolutely destroying them.

Another object is the provision of a machine of this character in which means are provided for engaging the plants and knocking off the insects or punctured or loose squares so that they will fall upon the ground in the path of the suction nozzles.

An additional object is the provision of a machine of this character which will be simple and inexpensive in manufacture, efficient in use, durable in service and a general improvement in the art.

With the above and other objects and advantages in view the invention consists in the details of construction to be hereinafter more fully described and claimed and illustrated in the accompanying drawings, in which:

Figure 1 is a side elevation of the machine,

Figure 2 is a top plan view,

Figure 3 is a section on the line 3—3 of Figure 2,

Figure 4 is a detail section through the fan,

Figure 5 is a section at right angles to Figure 4 taken on the line 5—5 of Figure 4, Figure 6 is a section on the line 6—6 of Figure 1, Figure 7 is a section on the line 7—7 of Figure 6, Figure 8 is a section on the line 8—8 of Figure 1, Figure 9 is a detail section on the line 9—9 of Figure 8, Figure 10 is an elevation of a portion of one side of the collecting receptacle, partly broken away, Figure 11 is an elevation of the opposite side, Figure 12 is a detail view of the hoods with the pipe sections thereof attached.

Referring more particularly to the drawings I have shown my device as comprising an arched axle 10 which carries ground engaging wheels 11 and which supports a frame 12 of any desired size, shape and detailed construction. The frame is equipped with a tongue 13 carrying a cross bar 14 from the end portions of which depend links 15 formed with a plurality of holes within selected ones of which are connected the securing members 15' which carry whiffle trees 16 for hitching on the draft animals. The lower ends of the links 15 have connected therewith rods 17 which extend rearwardly and which connect with the axle. This arrangement makes a strong, durable and rigid structure which will be eminently satisfactory in every respect.

Mounted upon the frame at some convenient portion thereof is a blower which includes a casing 18 within which is mounted a fan 19 carried by a suitable shaft 20. This blower is of the centrifugal type and has an elbow 21 connected with its inlet 22 which is necessarily at the center. Connected with the elbows 21 are rigid pipe sections 23 with which are connected, by flexible sections 24, other pipes 25 which terminate in shoes or hoods 26 designed to approach the ground rather closely or even to trail thereon if preferred. These hoods or shoes constitute inlet nozzles and they are of such shape and constructed as to gather up insects, punctured squares and other débris when the fan is in operation.

For regulating the height of these inlet nozzles or shoes, I provide one or more chains 27 connected with collars 28 on the pipes 25 and having selected links engaged upon suitable hooks 29 on the underside of the frame.

Mounted at some convenient location upon the frame is an elongated upright receptacle 30 having a flaring upper end 31 into which leads a pipe 32 connected with a outlet 33 of the blower so that material drawn up through the nozzles 26 will pass through the blower and be discharged into the receptacle 30.

The means for driving this blower consists of sprockets 34 carried by the ground engaging wheels and having trained thereover chains 35 which are in turn trained over sprockets 36 which have a spring ratchet mounting 37 on a counter-shaft 38. The purpose of this spring ratchet structure is to insure a positive drive of the shaft 38 at all times while permitting one wheel to travel faster than the other as when turning corners, without endangering the mechanism. The shaft 38 carries a fly wheel 39 to steady its motion and also carries a spur gear 40.

Journaled across a portion of the frame 12 in suitable bearings, is a short counter-shaft 41 which carries a spur pinion 42 meshing with the gear 40 and which carries a spur gear 43. There is further provided a third counter-shaft 44 carrying a spur pinion 45 meshing with the gear 43. The fan shaft 20 carries a beveled gear 46 meshing with a bevel gear 47 on the counter-shaft 44. By this connection it will be seen that when the machine is drawn along the ground the various shafts and gears will be rotated for imparting rotary movement to the blower fan.

It is hardly sufficient merely to collect the débris and insects in the receptacle 30 and I therefore provide means for crushing and killing the insects. In carrying out this feature of the invention I provide a plurality of rollers 48 arranged one above another within the receptacle 30 and carried by shafts 49. At one side of the receptacle these shafts are equipped with gears 50 and at the other side with gears 51. Co-acting with the rollers 48 are other similar rollers 52 which have their shafts 53 journaled through bearings 54 which are slidably mounted for movement transversely of the receptacle. The shafts 53 are provided at one end with gears 55 meshing with the gears 50 and are provided at their other ends with gears 56 meshing with the gears 51 so that the rollers in each pair will be simultaneously rotated in opposite direction. To insure perfect co-action of the pairs of rollers, I provide one side of the receptacle with guides 57 within which are slidable plungers 58 which carry the bearings 54 and which are formed with shoulders 59 for a purpose to be described. Within the guides are springs 60 which engage the plungers 58 for urging the rollers 52 into engagement with the rollers 48. The outer ends of the guides are closed by threaded plugs 61 which are adjustable to vary the tension on the springs.

To effect driving these rollers, I provide a gear 62 on the counter-shaft 38, which gear meshes with an intermediate gear 63 on a short counter-shaft 64, and the gear 63 in turn meshes with a gear 65 suitably journaled and meshing with the uppermost one of the gears 51. Between the gears 51 I provide intermediate gears 66 which mesh therewith and which operate to drive all of the crushing rollers simultaneously. To avoid any possibility of gumming and clogging these rollers, I provide scrapers therefor as clearly disclosed in Figures 6, 9 and 10. The scrapers which are indicated by the reference numeral 67 and are substantially channel shaped or U-shaped so as to engage the periphery and also the ends of the rollers. These scrapers are located within suitable recesses in the receptacle or within guides therein so that they will be incapable of displacement. In connection with the rollers 52 I provide similarly shaped scrapers 68 which engage against the bearings 54 and against the shoulders 59 so as to move with the rollers 52 when they yield against the resistance of the springs. All the scrapers bear against the periphery and ends of the rollers so that any accumulation of matter caused by crushing the bugs or débris will be prevented.

It is rather important that means be provided for knocking the insects and punctured squares from the plants and while this might be accomplished in any one of many ways, I provide a transverse bar 69 which carries a plurality of spaced depending rods 70 which knock against the plants in the row and exert sufficient shaking action to shake off the insects.

From the foregoing description and a study of the drawings it is believed that the operation will be thoroughly understood without any necessity whatever for further elaboration. There are only two operations involved, the sucking up of the insects and other matter to be destroyed and the subsequent crushing to destroy life absolutely, and these operations are accomplished as follows: The insects and other matter is sucked from the plants through the medium of the fan 19 up into the pipe sections 23, from the pipe sections this matter is drawn into the fan chamber 18 and then blowed therefrom to the crushing rollers, through the pipes 32 and into the receptacle 31 which contains the rollers as shown. It is to be noted that various features of adjustment and the like are provided so as to improve the efficiency of the device under various conditions.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. A boll weevil exterminator of the character described comprising a wheeled frame, a blower including a casing mounted on said frame adjacent its front end, an elbow extending from the front of said casing and communicating with the interior thereof, a pair of converging rigid pipe sections depending at a downward inclination from the elbow and communicating with each other at the connection with the elbow, flexible pipe sections terminally secured to said rigid sections, a rigid pipe section secured to each of the pipe sections, a hood secured to the free end of each last mentioned pipe section and being arranged adjacent the ground, a collar surrounding the last mentioned pipe section at the juncture of the hood therewith, chains having one end link secured to the collar and their opposite ends having selective links adapted to engage the frame, whereby the hoods may be adjustably associated with respect to the frame, a fan within the casing and means for supporting said fan in the wheels of the frame as described.

2. A boll weevil exterminator of the character described comprising a wheeled frame, a blower arranged adjacent the front end of said frame, converging pipe sections arranged at a downward inclination from the blower and terminating adjacent the ground, hoods terminally secured to the lower end of said pipe sections, means for adjustably associating said hoods with respect to the frame, a vertically disposed receptacle mounted upon the frame, a flared upper end formed on said receptacle, a pipe establishing communication between the blower and the flared end of the receptacle, pairs of superposed pressing rollers mounted for rotation within the receptacle and means whereby said blower and rollers respectively are supported upon the wheels of the frame.

In testimony whereof I affix my signature.

SANDERS P. SHELL.